United States Patent
Bader et al.

(10) Patent No.: US 10,547,700 B2
(45) Date of Patent: *Jan. 28, 2020

(54) DOCUMENT DISTRIBUTION FROM A PROCESSING SYSTEM UTILIZING PUSHED REFERENCES

(71) Applicant: International Business Machines Corporation, Armonk, NY (US)

(72) Inventors: Edward L. Bader, Los Angeles, CA (US); Nehemiah E. Clark, Los Angeles, CA (US); David S. Gaskins, Huntington Beach, CA (US); Adrian Hermosillo, Chino, CA (US); Bryan V. Pham, Temple City, CA (US)

(73) Assignee: International Business Machines Corporation, Armonk, NY (US)

( * ) Notice: Subject to any disclaimer, the term of this patent is extended or adjusted under 35 U.S.C. 154(b) by 175 days.

This patent is subject to a terminal disclaimer.

(21) Appl. No.: 15/481,913

(22) Filed: Apr. 7, 2017

(65) Prior Publication Data
US 2017/0272520 A1      Sep. 21, 2017

Related U.S. Application Data (63) Continuation of application No. 15/074,015, filed on Mar. 18, 2016.

(51) Int. Cl.
| | |
|---|---|
| *G06F 15/16* | (2006.01) |
| *H04L 29/08* | (2006.01) |
| *G06F 16/93* | (2019.01) |
| *G06Q 10/10* | (2012.01) |

(52) U.S. Cl.
CPC .............. *H04L 67/26* (2013.01); *G06F 16/93* (2019.01); *G06Q 10/103* (2013.01); *H04L 67/06* (2013.01); *H04L 67/1097* (2013.01)

(58) Field of Classification Search
CPC ...... H04L 67/26; H04L 67/06; H04L 67/1097
USPC .................................................. 709/202–207
See application file for complete search history.

(56) References Cited

U.S. PATENT DOCUMENTS

| | | | |
|---|---|---|---|
| 5,781,901 A * | 7/1998 | Kuzma ................ | G06Q 10/107 709/206 |
| 5,790,790 A * | 8/1998 | Smith ................. | G06F 17/3089 709/206 |
| 5,892,909 A | 4/1999 | Grasso | |
| 7,367,048 B2 | 4/2008 | Kelley | |
| 8,495,751 B2 | 7/2013 | Joyce et al. | |

(Continued)

OTHER PUBLICATIONS

Box, Getting Started Guide: for New Users, Box User Guide, Nov. 5, 2015, retrieved from https://community.box.com/t5/Getting-Started-Guide-for-New/Box-User-Guide/ta-p/6807 on Mar. 18, 2016, 5 pages.

(Continued)

*Primary Examiner* — Bharat Barot
(74) *Attorney, Agent, or Firm* — Farrokh Pourmirzaie; Edell, Shapiro & Finnan, LLC (57) ABSTRACT

Distributing access to a document from a processing system includes sending or pushing a reference for a document within a repository to a storage area of a recipient system of a recipient to enable retrieval of the document from the repository. The reference is removed from the storage area of the recipient system of the recipient in response to an expiration of the document.

8 Claims, 10 Drawing Sheets

(56) References Cited

U.S. PATENT DOCUMENTS

| | | | |
|---|---|---|---|
| 8,898,318 B2 | 11/2014 | Galvin | |
| 9,525,692 B2 | 12/2016 | Gaudet | |
| 9,648,119 B2 | 5/2017 | Fablet | |
| 10,154,107 B2* | 12/2018 | Bader | G06F 16/93 |
| 2008/0059584 A1 | 3/2008 | Lam et al. | |
| 2010/0011077 A1* | 1/2010 | Shkolnikov | H04L 51/063 |
| | | | 709/206 |
| 2010/0077468 A1* | 3/2010 | Pragides | G06F 17/30572 |
| | | | 709/203 |
| 2014/0068401 A1 | 3/2014 | Kirigin | |
| 2017/0272527 A1 | 9/2017 | Bader et al. | |

OTHER PUBLICATIONS

Dropbox, Dropbox Business User Guide: learn how to sync, share and manage your files with Dropbox Business, retreived from https://www.dropbox.com/guide/business on Mar. 18, 2016, 67 pages.

Goggle, Overview of Google Docs, Sheets, and Slides, © 2016, retrieved from https://support.google.com/docs/answer/49008?hl=en on Mar. 18, 2016, 2 pages.

WorkZone Exlporer, User's Guide, Scanjour, © ScanJour A/S 2013, retreived from http://help.scanjour.dk/wzcs/4.6SP1/UserGuides/WZExplorer/ on Mar. 18, 2016, 24 pages.

IBM Corporation, IBM Content Navigator Overview and Demonstration, © 2011, retrieved from http://www-03.ibm.com/software/products/en/content-navigator on Mar. 18, 2016, 34 pages.

List of IBM Patents or Patent Applications Treated as Related, Apr. 2017, 1 page.

* cited by examiner

DOCUMENT DISTRIBUTION FROM A PROCESSING SYSTEM UTILIZING PUSHED REFERENCES

CROSS-REFERENCE TO RELATED APPLICATIONS

This application is a continuation of U.S. patent application Ser. No. 15/074,015, entitled "DOCUMENT DISTRIBUTION FROM A PROCESSING SYSTEM UTILIZING PUSHED REFERENCES" and filed Mar. 18, 2016, the disclosure of which is incorporated herein by reference in its entirety.

BACKGROUND

Present invention embodiments relate to processing systems, and more specifically, to document distribution techniques for processing systems that push document references to a recipient to ensure a recipient is aware of the document.

In order to manage workflow, many organizations utilize processing systems, such as content management systems, that track progress on a particular task or document for a group of employees. However, even with these systems in place, shared documents often get overlooked or forgotten since they are frequently intermingled with emails and tasks already present in a user's inbox or queue, respectively. Moreover, employees are often required to use multiple applications to manage their documents and/or use expensive and complex workflow engines.

SUMMARY

According to one embodiment of the present invention, distributing access to a document from a processing system includes sending or pushing a reference for a document within a repository to a storage area of a recipient system of a recipient to enable retrieval of the document from the repository. The reference is removed from the storage area of the recipient system of the recipient in response to an expiration of the document.

BRIEF DESCRIPTION OF THE DRAWINGS

Generally, like reference numerals in the various figures are utilized to designate like components.

DETAILED DESCRIPTION

Presented herein are techniques for distributing a document utilizing pushed references. Generally, the techniques provided herein push document references to any selected users. Since the document references are pushed to recipients, the recipients do not have the ability to reject the pushed document references and the document references cannot be refused. Moreover, the techniques presented herein create a notification separate from any emails or tasks when a document is pushed to a recipient. Consequently, the pushed document reference will not get overlooked amongst ever-increasing email traffic. The notification also cannot be deleted or removed by the recipient unless the recipient reviews the pushed document. Moreover, in at least some present invention embodiments, the sender may receive a notification when a recipient has received and reviewed the document being shared via the reference.

These techniques create a more efficient manner of distributing documents, such as to a group of team members within an enterprise. Moreover, the techniques provided herein allow users to easily access shared documents and share documents without utilizing email. Notably, when documents are shared via email, recipients can easily forward updated versions without their entire team having access or visibility to the updated versions.

Figure 1:
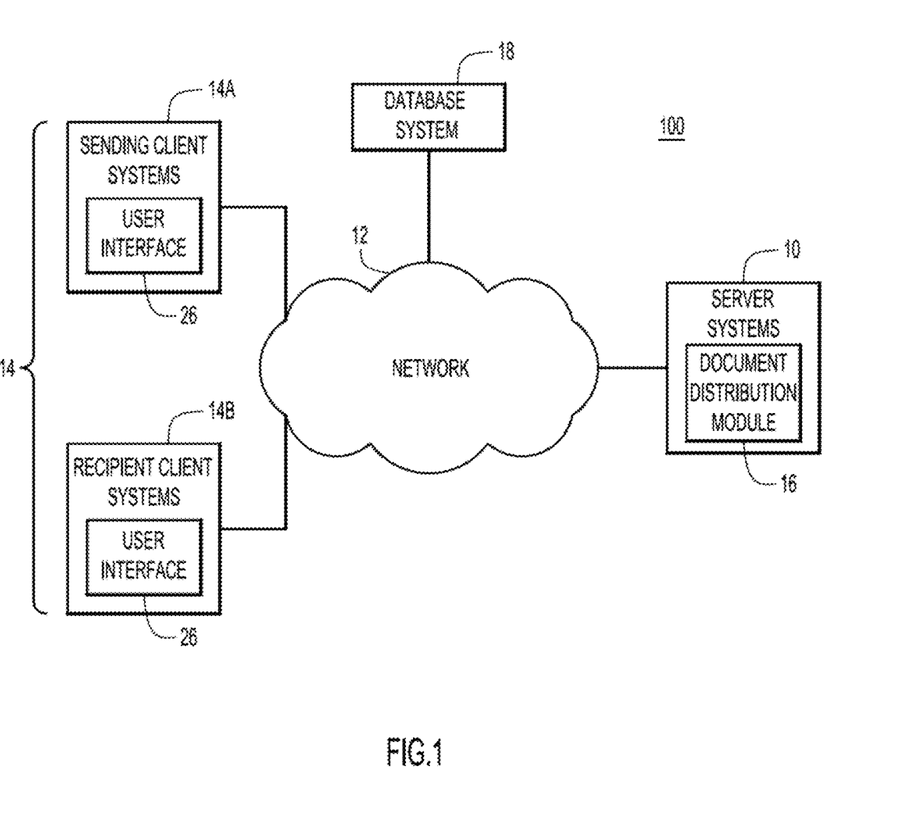
FIG. 1 illustrates an example environment in which the present general inventive concept can be embodied.

An example environment for use with present invention embodiments is illustrated in FIG. 1. Specifically, the environment includes one or more server systems 10, and one or more client or end-user systems 14 (including sending client systems 14A and recipient client systems 14B). Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

In the present invention embodiment depicted in FIG. 1, the server system 10 includes a document distribution module 16 to control distribution of documents between senders and recipients. However, in other embodiments, the document distribution module 16 may also be disposed, either entirely or partially, on the client systems 14. Document distribution module 16 may include one or more modules or units to perform the various functions of present invention embodiments described below.

A database system 18 may store various information for the document distribution module 16 (e.g., documents, versions of documents, expiration dates, groups of users, etc.). The database system 18 may be implemented by any conventional or other system, such as a database or storage unit, may be local to or remote from server systems 10 and client systems 14, and may communicate via any appropriate communication medium (e.g., local area network (LAN), wide area network (WAN), Internet, hardwire, wireless link, Intranet, etc.). The client systems 14 may present a graphical user (e.g., GUI, etc.) or other user interface 26 (e.g., a user interface provided by a content management application, command line prompts, menu screens, etc.) to solicit information from users pertaining to the distribution of documents (e.g., the document to be distributed, an expiration date, a group of recipients, etc.).

Server systems 10 and the corresponding applications may be provided in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones or other devices, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 2:
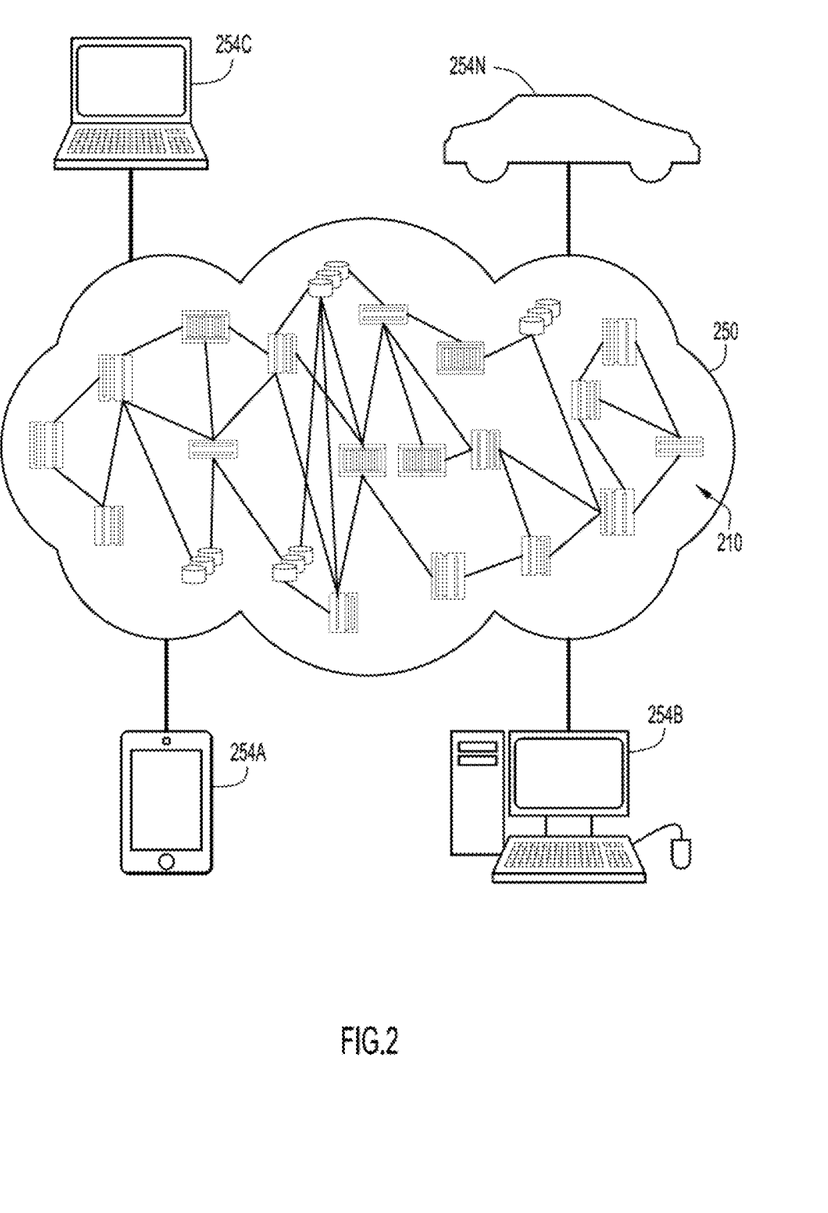
FIG. 2 is a diagrammatic illustration of an example cloud computing environment for the computing environment of FIG. 1 according to an embodiment of the present invention.

A cloud computing environment is service oriented with a focus on statelessness, low coupling, modularity, and semantic interoperability. At the heart of cloud computing is an infrastructure comprising a network of interconnected nodes. Referring now to FIG. 2, illustrative cloud computing environment 250 is depicted. As shown, cloud computing environment 250 comprises one or more cloud computing nodes 210 (e.g., including server systems 10) with which local computing devices (e.g., including client systems 14) used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 210 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
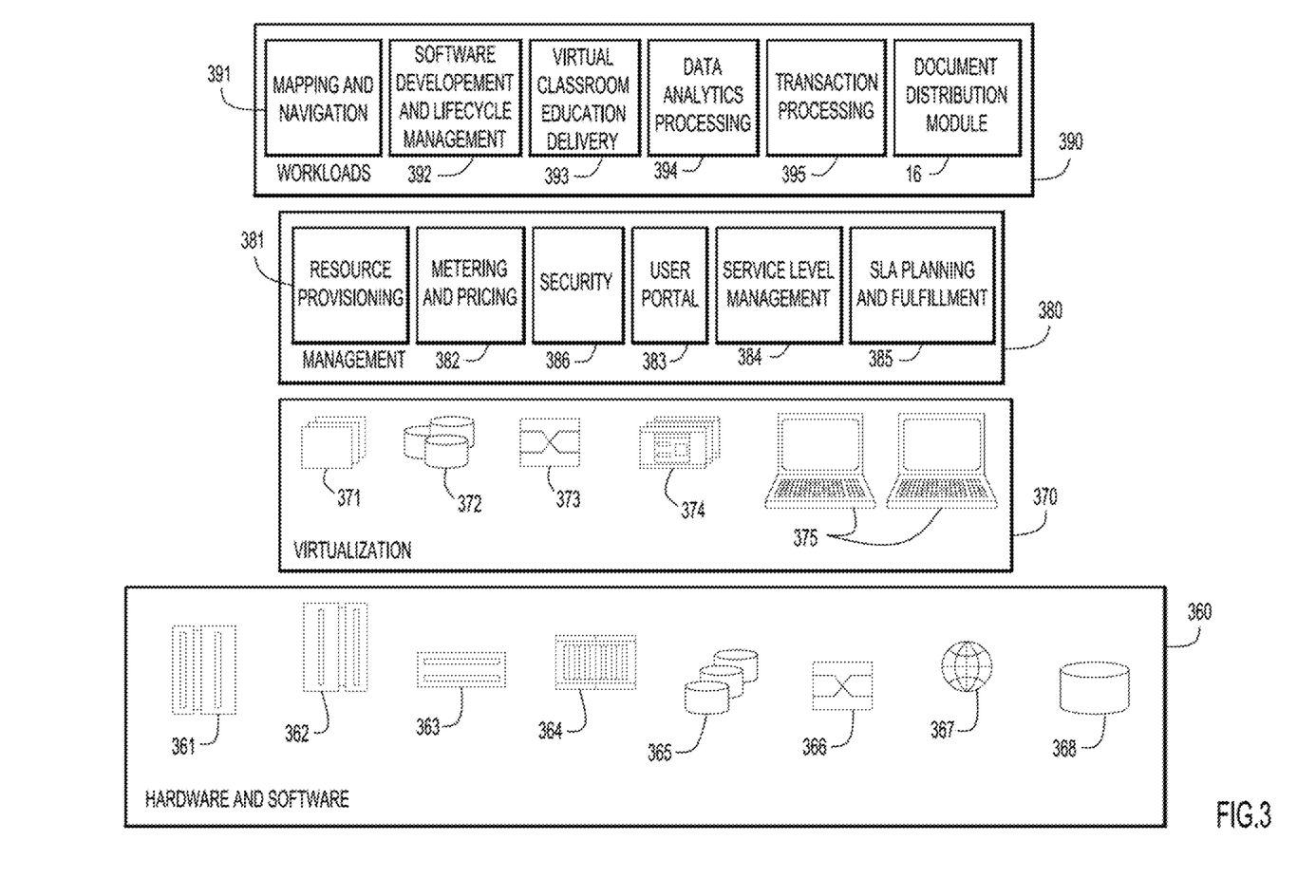
FIG. 3 is a diagrammatic illustration of abstraction model layers according to an embodiment of the present invention.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example embodiment, management layer 380 may provide some or all of the functions for server systems 10 described herein. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may comprise application software licenses. Security 386 provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and document distribution (e.g., via document distribution module 16).

Figure 4:
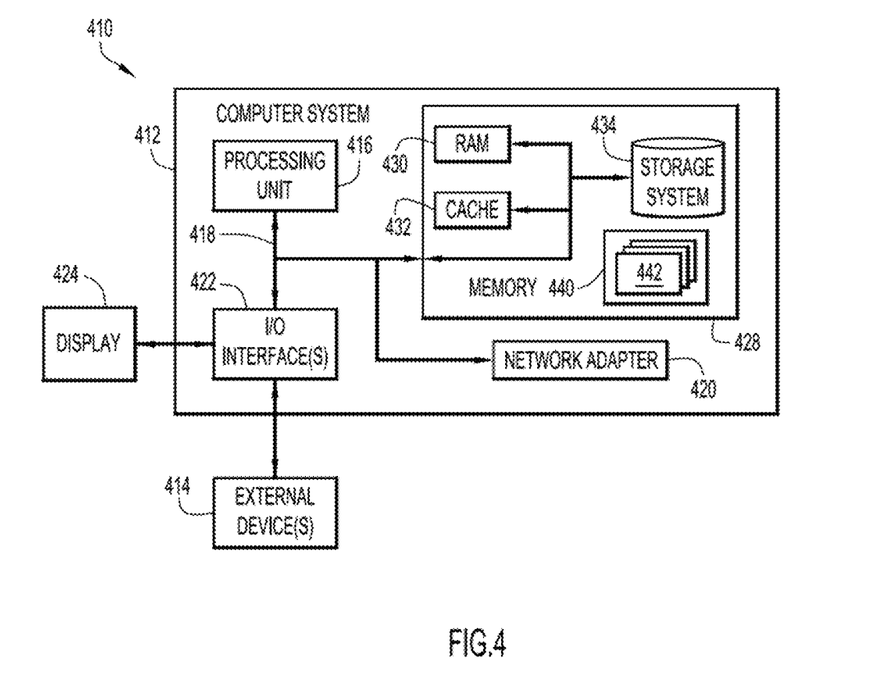
FIG. 4 is a block diagram of a computing node according to an embodiment of the present invention.

Referring now to FIG. 4, a schematic of an example of a computing node or device 410 for computer environment 100 (e.g., server systems 10 and client systems 14, etc.) and cloud environment 250 (e.g., cloud computing node 210, etc.) is shown. The computing node or device is only one example of a suitable computing node for computing environment 100 and cloud computing environment 250 and is not intended to suggest any limitation as to the scope of use or functionality of embodiments of the invention described herein. Regardless, computing node 410 is capable of being implemented and/or performing any of the functionality set forth herein.

In computing node 410, there is a computer system 412 which is operational with numerous other general purpose or special purpose computing system environments or configurations. Examples of well-known computing systems, environments, and/or configurations that may be suitable for use with computer system 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 412 may be described in the general context of computer system executable instructions, such as program modules, being executed by a computer system. Generally, program modules may include routines, programs, objects, components, logic, data structures, and so on that perform particular tasks or implement particular abstract data types. Computer system 412 may be practiced in distributed cloud computing environments where tasks are performed by remote processing devices that are linked through a communications network. In a distributed cloud computing environment, program modules may be located in both local and remote computer system storage media including memory storage devices.

In FIG. 4, computer system 412 is shown in the form of a general-purpose computing device. The components of computer system 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 412 typically includes a variety of computer system readable media. Such media may be any available media that is accessible by computer system 412, and it includes both volatile and non-volatile media, removable and non-removable media.

System memory 428 can include computer system readable media in the form of volatile memory, such as random access memory (RAM) 430 and/or cache memory 432. Computer system 412 may further include other removable/non-removable, volatile/non-volatile computer system storage media. By way of example only, storage system 434 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 (e.g., including document distribution module 16) generally carry out the functions and/or methodologies of embodiments of the invention as described herein.

Computer system 412 may also communicate with one or more external devices 414 such as a keyboard, a pointing device, a display 424, etc.; one or more devices that enable a user to interact with computer system 412; and/or any devices (e.g., network card, modem, etc.) that enable computer system 412 to communicate with one or more other computing devices. Such communication can occur via Input/Output (I/O) interfaces 422. Still yet, computer system 412 can communicate with one or more networks such as a local area network (LAN), a general wide area network (WAN), and/or a public network (e.g., the Internet) via network adapter 420. As depicted, network adapter 420 communicates with the other components of computer system 412 via bus 418. It should be understood that although not shown, other hardware and/or software components could be used in conjunction with computer system 412. Examples, include, but are not limited to: microcode, device drivers, redundant processing units, external disk drive arrays, RAID systems, tape drives, and data archival storage systems, etc.

Figure 5:
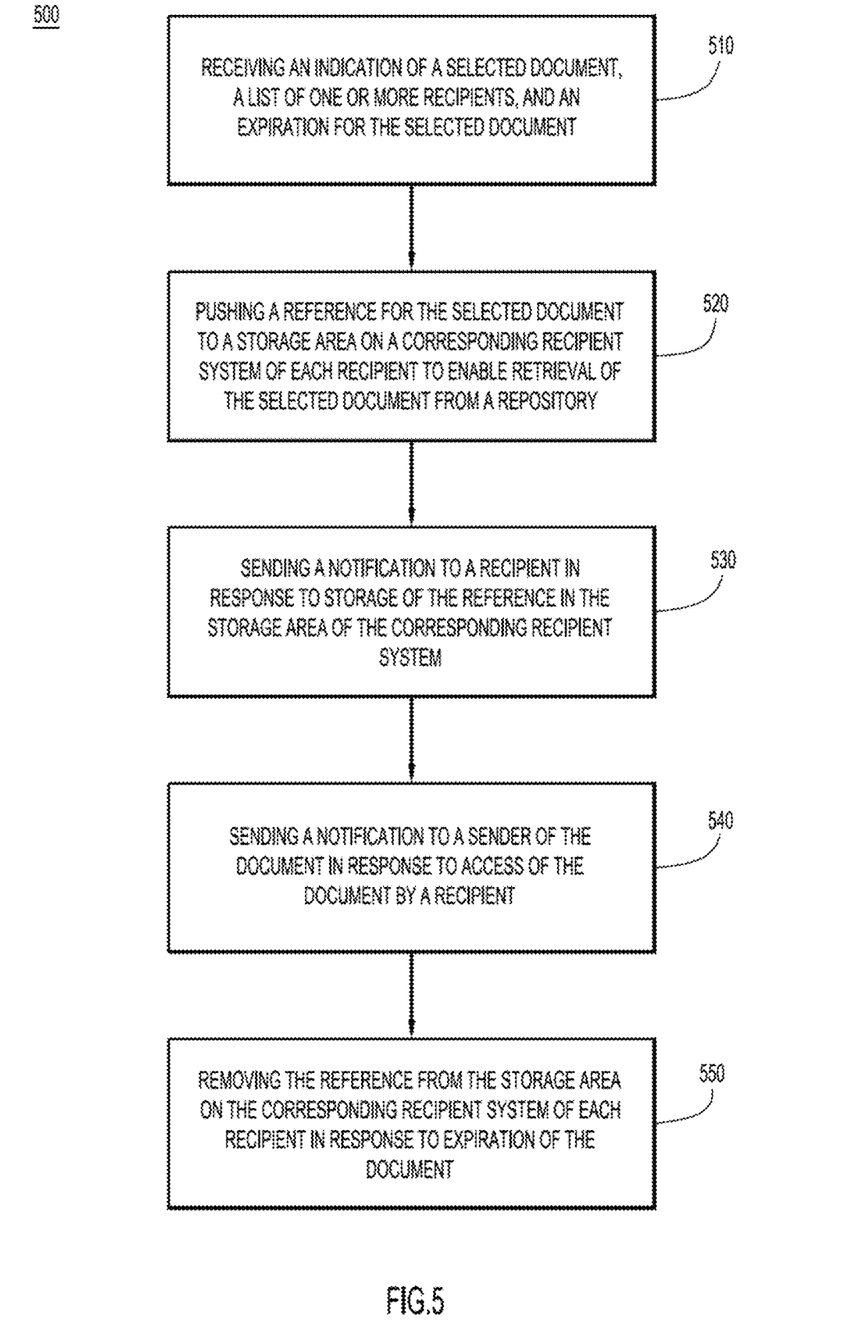
FIG. 5 is a procedural flow chart of distributing documents from a processing system utilizing pushed references, according to a present invention embodiment.

With reference now to FIG. 5, procedural flow chart 500 depicts operations (e.g., of document distribution module 16) for distributing documents from a processing system, such as an enterprise content management system (also referred to herein simply as a content management system) utilizing pushed references. Initially, at step 510, the processing system (e.g., implemented by server systems 10) receives an indication of a selected document within a repository, a list of one or more recipients, and an expiration for the selected document.

In some embodiments, the indication of a selected document may be received when a sender selects a document stored with a repository associated with the processing system (e.g., database 18 or memory 35 included in server systems 10). Additionally or alternatively, an indication of a selected document may be received when a user selects a file from storage local to his or her client system. In these scenarios, a copy of the document may be made and uploaded to the repository and then an indication may be provided in the same manner that an indication is provided when a file is selected directly from the repository. In some present invention embodiments, shared documents may be divided or segmented automatically upon being shared and/or uploaded to the repository associated with the server. Additionally or alternatively, a document may be segmented or divided in accordance with instructions from a sender. As is discussed in further detail below, segmented documents may allow for more detailed notifications to be provided to the sender and/or more focused references to be sent to recipients.

The group of recipients, as well as the expiration, may be indicated separate from or together with the document indication. For example, in some present invention embodiments, such as the embodiment of the present invention depicted in FIGS. 7-10, recipients may be selected in a drop down menu that is provided in a sender's user interface subsequent to the sender selecting a document. The group may include any number of recipients or may include a preselected group, such as a team or committee from an enterprise environment. Moreover, in at least some present invention embodiments, any user may act as a sender, recipient, or both at any time. If a user has access to a document, he or she may share the document by providing an indication of that document, a list of recipients, and an expiration. Security or document control may be deferred to the repository or content management system responsible for storing the to-be-shared documents.

The expiration may be an expiration date, time, duration, or any other such period of time and may define how long a reference to a shared document is to remain available. The expiration may be set by the sender (so that the server receives an indication) in any desirable manner (e.g., selecting a date in a calendar). Additionally or alternatively, the expiration may indicate that a link should expire after a certain number of uses, at the sender's discretion, or any other desirable manner. In fact, in some embodiments, a reference may be terminated (e.g., rendered inactive) based on commands received from the sender at any time in order to provide the sender with more fine-grained access control. That being said, in some embodiments, recipients may have continued access to a document and the push-shared reference may simply draw the recipient's attention to the document, as is described below in further detail.

At step 520, a reference for the selected document is pushed to the storage area of a recipient system corresponding to each of the indicated recipients. For example, a link to the selected document (which is stored in the repository associated with the server) may be pushed to a "Favorites" section of a document management application of the corresponding recipients. Notably, since the reference is pushed to the storage area of the corresponding recipients, the recipients cannot decline or reject the reference. Instead, the reference is forced upon the recipients and, thus, the recipient may be more likely to review the shared document (via the reference).

The reference also enables the recipients to retrieve the selected document, even as the document is updated or edited. In some present invention embodiments, the reference may be automatically updated as the selected document is updated and, thus, may continually allow the recipients to retrieve the latest version of the selected document. Additionally or alternatively, the reference may remain constant and the document may be continually updated as users (e.g., senders and recipients) update or edit the document. Still further, in some present invention embodiments, multiple references can be created for the same shared document. Multiple references may allow the sender to provide different recipients with different levels of access or different expirations. In some present invention embodiments, the access level, expiration, or any other attribute of the reference may be determined automatically, based on commands received from the sender, or some combination thereof As an example, consider a scenario where two meetings are being conducted based on the same document: a first meeting on a first date and a second meeting on a second date, which is later than the first date. In this scenario, any employees scheduled to participate in the first meeting may be sent a first reference which expires the day of or the day before the first meeting. Meanwhile, employees scheduled to participate in the second meeting may be sent a second reference (to the same document) which expires the day of or the day before the second meeting. The different expirations may ensure these employees review the document prior to their respective meetings. If an employee is scheduled to attend both meetings, the employee may be sent two references or a single reference to the latter meeting, at the sender's discretion. In this scenario, the expiration of the reference for a particular employee may be determined by analyzing the corresponding recipient's schedule and/or based on instructions from the sender.

As another example, in some present invention embodiments, a document may be segmented in different manners for different recipients and references sent to recipients may reference versions of the document with different segmentations. For example, if a manager is sending a document to his or her team and wants to ensure that different team members have reviewed specific sections of the document, the document may be segmented accordingly for each team member. For example, a marketing section of the document may be separated into a unique segment for the team member in charge of marketing, an engineering section may be separated into a unique segment for a team member in charge of engineering, and so forth, based on instructions received from the sender. Then, a unique reference could be created for and sent to the recipient corresponding to the particular segments or segmented version of the document. In these present invention embodiments, employee information, or any other pertinent information may be used to automatically provide different recipients with references that provide different level of access. Additionally or alternatively, instructions from the sender to parse/segment a document and create references accordingly.

At step 530, a notification is sent to the recipient in response to storage of the reference in the storage area of the corresponding recipient system. For example, a pop-up or message notification may appear in the user interface of a content management application utilized by the recipient. In some present invention embodiments, a pop-up message or any other type of notification may also be pushed to the home screen of the user's computing device to notify the user of the reference. In some present invention embodiments, the notification may include the reference, so that the recipient can quickly view the shared document, but, in other present invention embodiments, the notification may simply prompt the recipient to view a specific file in his or her content management application, such as a "Favorites" folder. In some present invention embodiments, the notification to the recipient may also include the time until expiration (e.g., days, hours, minutes, etc.), accesses until expiration (e.g., one access left) or any other count towards expiration.

Once a recipient accesses the shared document (e.g., via the reference), a notification is sent to the sender of the shared document at step 540. Server systems 10 are notified of the access based on the recipient actuating the reference or link. Basically, this actuation initiates retrieval of the document from the repository by server systems 10, thereby providing notice of the access to the server systems 10. In most present invention embodiments, the notification sent to the sender includes the names of the recipients or groups of recipients who have reviewed the shared document and the name of the shared document; however, in other embodiments of the present invention, the notification may also include additional information, such as information indicating a viewership percentage and/or a reviewed percentage. The viewership percentage indicates the percentage of intended recipients (e.g., any recipients included in the group of recipients selected at step 510) that have reviewed the shared document. The viewership percentage may be indicated or displayed in any desirable manner, such as a progress bar, and may enable a sender (e.g., a manager) to easily determine how many of the intended recipients have accessed a shared document. By comparison, the reviewed percentage indicates the percentage of a document that a particular recipient has been reviewed. In at least some embodiments, the reviewed percentage is detected by utilizing document segmentation as discussed above with respect to step 520. Then, as a recipient reviews segments of a document, the reviewed percentage may be incremented accordingly.

At step 550, the reference is removed from the storage area on the corresponding recipient system of each recipient system in response to expiration of the reference. Regardless of the type or number of references created and sent for a particular shared document, the expiration set at step 510 may determine how long a particular reference remains active. Additionally or alternatively, in some embodiments, a recipient may be permitted to remove a reference after the recipient has reviewed the document referenced by that reference, even prior to the expiration.

In some present invention embodiments, expiration of a reference may cause the shared document to become inaccessible to the recipient of the reference. However, in other present invention embodiments, removal (e.g., deletion) of a reference upon expiration may not cause a user to lose access to the document. Instead, the user may have permanent access to the repository where the document is stored, or at least a portion thereof, and the expiration of the reference may simply remove the reference from the "Favorites" folder of the recipient's document management system. In these embodiments, security may be provided by the repository or the system managing the repository and the reference. In other words, in at least some present invention embodiments, a pushed reference does not provide authority to a recipient to view a document. Instead, a pushed reference forces a recipient's attention to a document that the recipient can already access in a manner that cannot be refused.

Notably, even after the reference to the shared document is removed from the storage area (such as the Favorites folder), a sender (or recipient) may have continued access to a shared document. Moreover, in some present invention embodiments, records may be maintained to record which documents have been shared by which users, which documents have been received and/or reviewed by which users, and so forth. These records may enable a sender to review the reference status (e.g., active or inactive, insofar as inactive references denote removed references) of any references for a particular document and, thus, may prompt a sender to re-share a document that only has inactive references.

Figure 6:
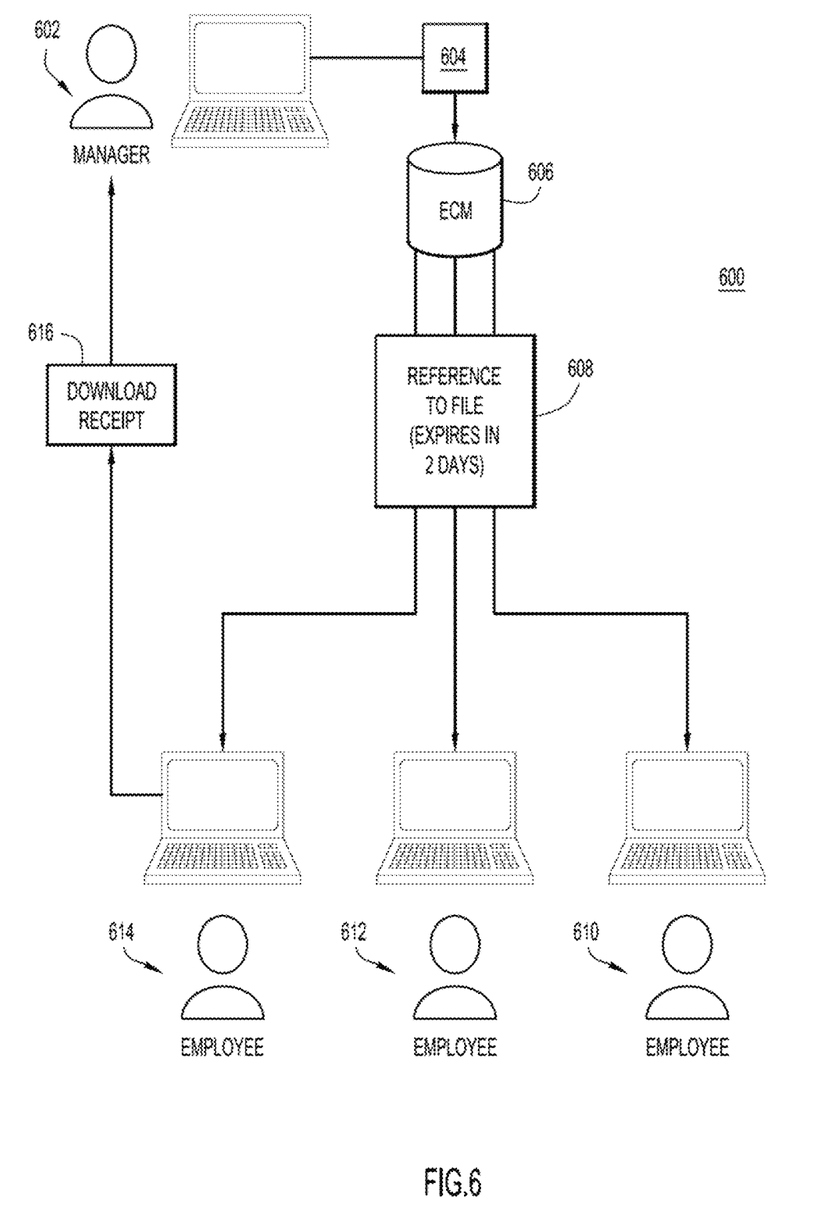
FIG. 6 is a block diagram depicting document distribution from a processing system utilizing pushed references, according to a present invention embodiment.

FIG. 6 provides a block diagram 600 illustrating an example scenario where a manager is push-sharing a document reference to three of his or her employees. In this particular example, the techniques described herein are performed by an Enterprise Content Management (ECM) system 606 (e.g., implemented by server systems 10). Initially, manager 602 selects a document 604 from a repository included in the ECM system 606. The manager also indicates that document 604 should be shared with three employees (Employee 610, Employee 612, and Employee 614) and that the expiration for a reference to document 604 should be two days. Consequently, a reference 608 is created and pushed to a storage area in the ECM application of Employee 610, Employee 612, and Employee 614, such as a Favorites section or folder, for a duration of two days. The ECM client application will then inform the recipients, via a notification, of the new reference (or new favorite if the reference is stored in a favorites section).

As the employees review document 604, download receipts including an employee identifier and an identifier for document 604 are sent to the manager 602 (e.g., via server systems 10). For example, in the depicted embodiment, Employee 614 has reviewed document 604, thereby causing download receipt 616 to be sent to the manager 602. After the expiration date has occurred (two days in this scenario), the server systems will then delete the document reference 608 from the ECM application of Employee 610, Employee 612, and Employee 614.

Since the reference 608 is pushed (or push-shared) to Employee 610, Employee 612, and Employee 614, these employees (or their systems) cannot reject the reference.

Moreover, Employee 610, Employee 612, and Employee 614 will be unable to remove reference 608 without viewing the document. This may prove to be extremely useful in business scenarios where a document is being shared from one level of a hierarchy (a manager) to another level of the hierarchy (the manager's direct reports). As is discussed in further detail below in connection with FIGS. 7-10, in at least some present invention embodiments, the pushed references are stored in a Favorites folder of a recipient's workflow management application and a large message is displayed to indicate the presence of an active reference.

Figure 7:
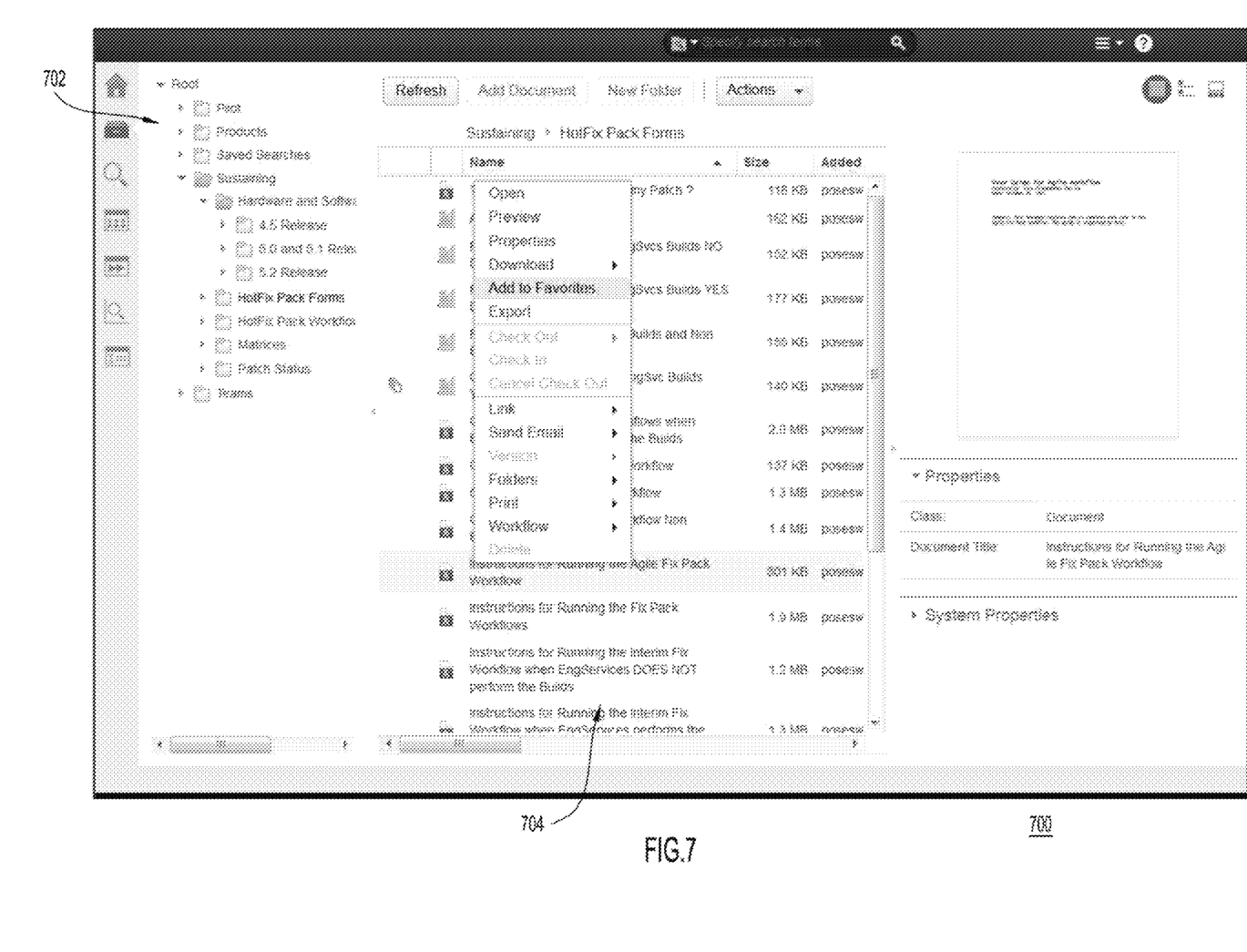
FIGS. 7 and 8 are screen shots of example user interfaces for a user that is distributing a document utilizing pushed references, according to a present invention embodiment.
Figure 8:
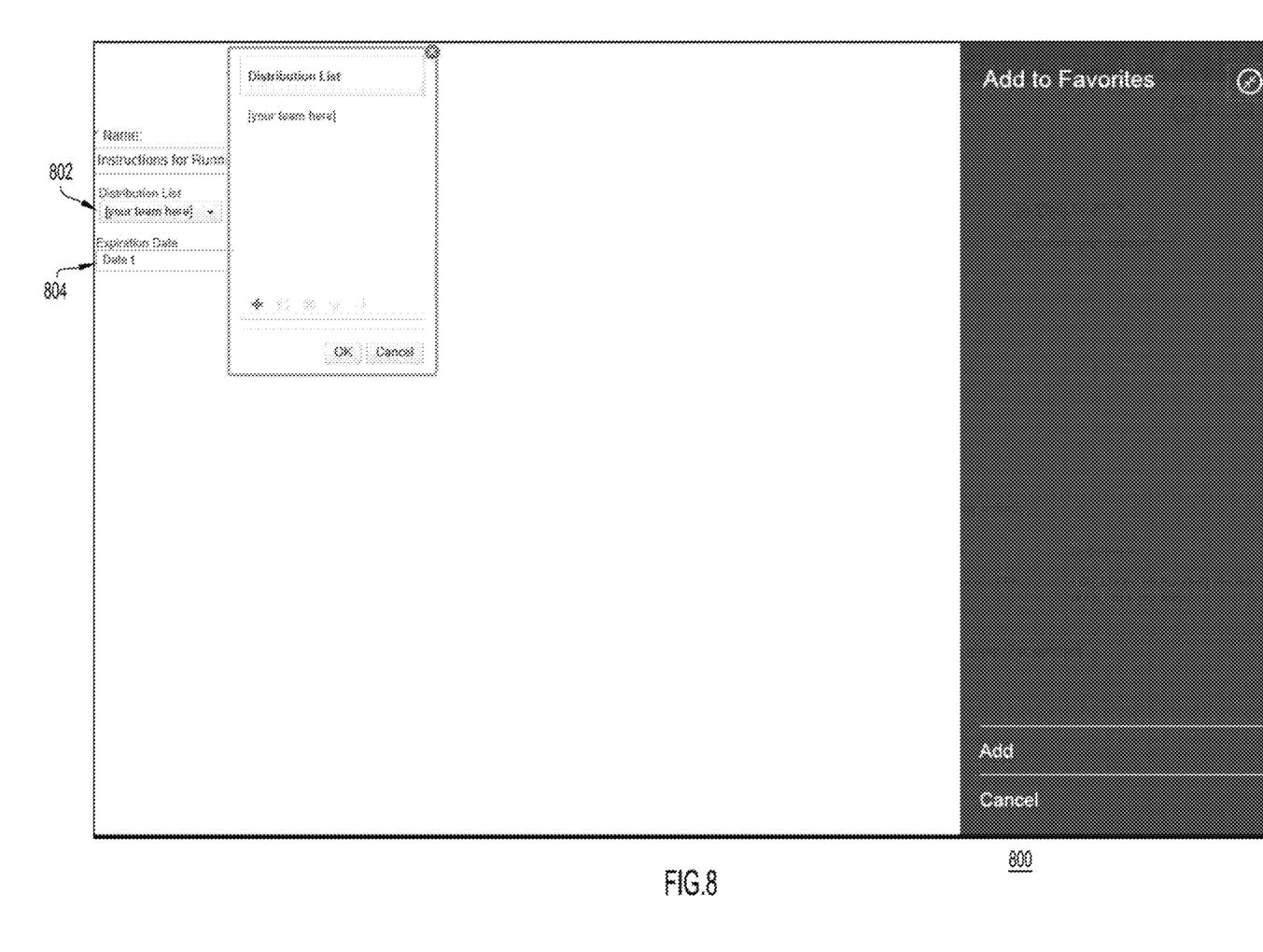
Figure 9:
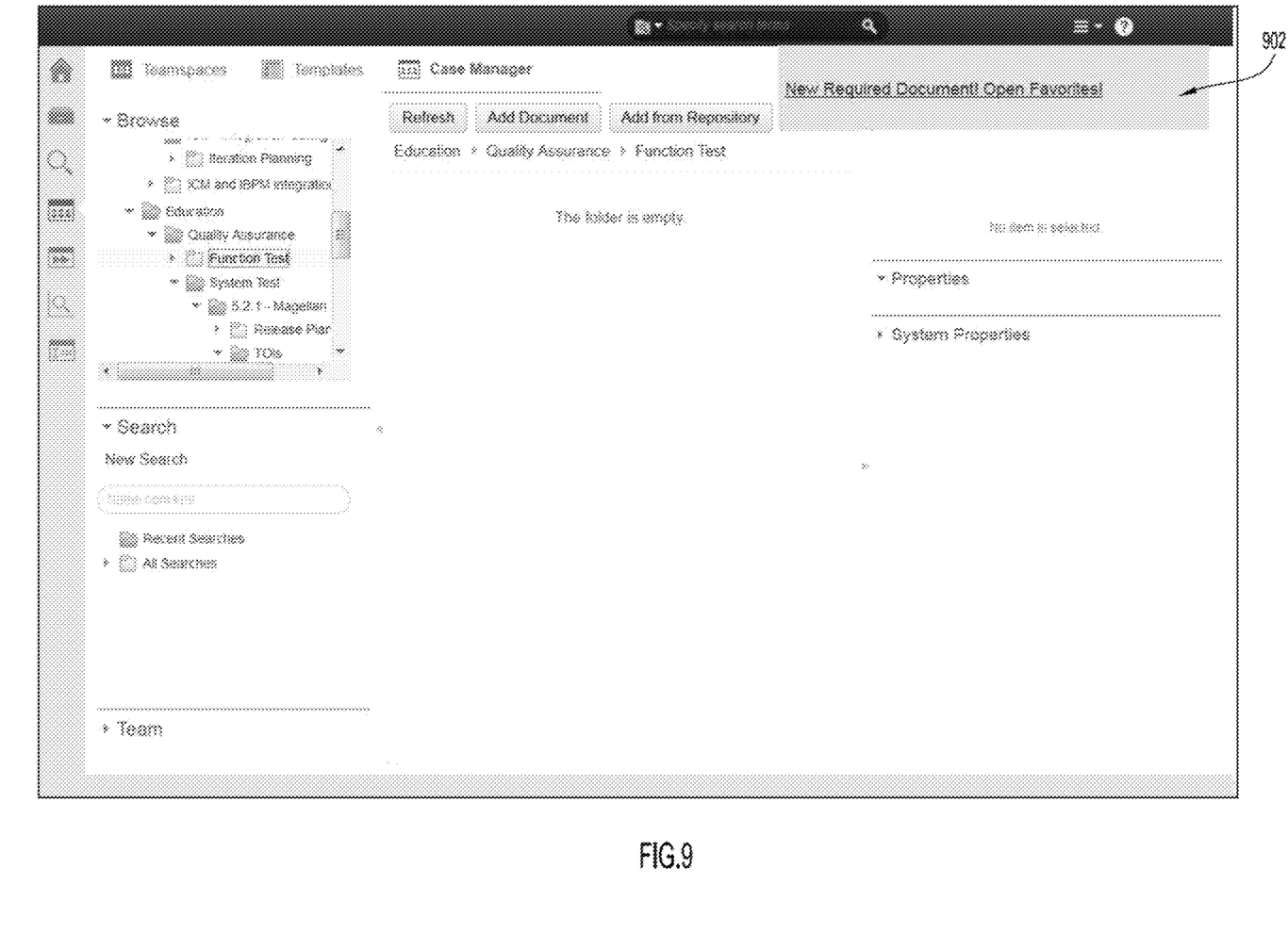
FIGS. 9 and 10 are screen shots of example user interfaces for a user that is receiving a distributed document utilizing pushed references, according to a present invention embodiment.
Figure 10:
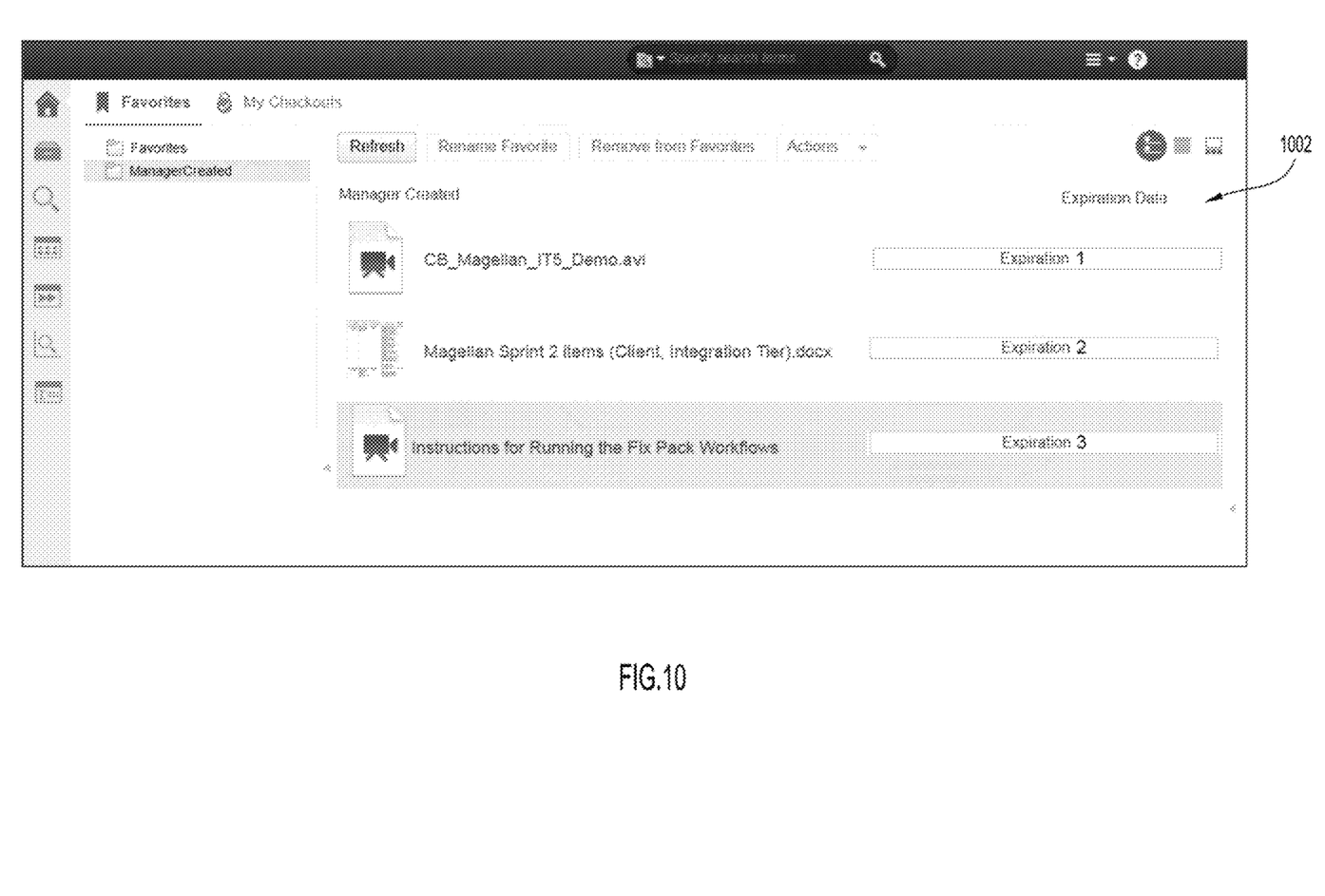

Now turning to FIGS. 7-10, screen shots of example user interfaces for the ECM system depicted in FIG. 6 are illustrated. The screen shots included in FIGS. 7 and 8 illustrate a user interface for a sending user while the screen shots included in FIGS. 9 and 10 illustrate for a recipient of a pushed-link. More specifically, in FIG. 7, the user interface 700 is displaying a list of documents stored in a repository. At 702, various folders from the repository are shown and at 704, documents within a selected folder are displayed. As illustrated, a sender can simply select a document and elect "Add to Favorites" in order to provide an indication of a specific document to be shared with pushed references. Once selected, the user interface requests one or more recipients and an expiration, as shown at user interface 800 of FIG. 8. In the depicted user interface, a user may input any number of recipients at 802 and may set an expiration date at 804.

In FIGS. 9-10, an example user interface is shown subsequent to receiving the reference sent by the user in FIGS. 7-8. In this particular embodiment, the ECM application provides a highlighted notification 902 at the top right of the user interface 900. The recipient can click on the notification which will take the recipient to his or her favorites folder 1000, as shown in FIG. 10. In the favorites folder 1000, any active references are listed at 1002, together with their expiration date. In some embodiments, the references are sorted by expiration date; however, in other embodiments, the references may be sorted in any manner. In these particular embodiments, references received from the recipient's manager are further aggregated together into a folder named "Manager Created." This folder may separate pushed references from the recipient's manager from any other references the recipient is currently storing as a favorite, thereby easing workflow issues.

The techniques provided herein have a number of advantages. As one example, the combination of push-sharing references and providing download receipts in a content management system may simplify the content management experience, simplify workflow, and ensure employees review necessary documents in a timely manner while keeping a manager apprised of progress. The references also include various context and may be personalized or differentiated for multiple recipients within or between groups. Also, since pushed references are deleted upon expiration, the techniques presented herein remove the onus from recipients to clean or organize an inbox, task list, reminder list, etc.

Still further, due to the techniques presented herein, shared documents (or references thereto) will no longer be comingled amongst email traffic and no longer need to be shared via email, thereby reducing oversights and email traffic. Moreover, the techniques provided herein allow users to utilize a single application to manage documents (as opposed to emailing documents and tracking the documents in a separate workflow application) without implementing a complex or expensive workflow engine or designer. The techniques provided herein also provide notifications that a recipient has reviewed a shared document within an enterprise content management system. Put generally, the techniques provided herein resolve a technical problem that is necessarily rooted in computer technology and, in particular, content management systems.

It will be appreciated that the embodiments described above and illustrated in the drawings represent only a few of the many ways of implementing embodiments for distributing documents from a processing system utilizing pushed references.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, document distribution module, etc.). These systems may include any types of monitors and input devices (e.g., keyboard, mouse, voice recognition, etc.) to enter and/or view information.

It is to be understood that the software (e.g., document distribution module 16) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., document distribution module 16) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., documents, recipient information, document segments, etc.). The database system may be implemented by any number of any conventional or other databases, data stores or storage structures (e.g., files, databases, data structures, data or other repositories, etc.) to store information (e.g., documents, recipient information, document segments, etc.). The database system may be included within or coupled to the server and/or client systems. The database systems and/or storage structures may be remote from or local to the computer or other processing systems, and may store any desired data (e.g., documents, recipient information, document segments, etc.).

The present invention embodiments may employ any number of any type of user interface (e.g., Graphical User Interface (GUI), command-line, prompt, etc.) for obtaining or providing information (e.g., a indication of a document, expiration, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touchscreen, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of distributing access to a document comprising:
    pushing a reference for a document selected within a repository for a recipient to a designated folder in a document management structure of a storage area of a recipient system of the recipient, wherein the reference includes a link to the document;
    retrieving the document from the repository and providing access to the document by the recipient system in response to actuation of the link from the designated folder of the recipient system; and
    removing the reference from the designated folder of the storage area of the recipient system in response to occurrence of an expiration of the document, wherein the expiration indicates a duration the link is available to access the document.

2. The computer-implemented method of claim 1, further comprising:
    sending a notification to the recipient in response to the pushing of the reference to the storage area of the recipient system.

3. The computer-implemented method of claim 1, wherein the storage area includes a favorites folder.

4. The computer-implemented method of claim 1, further comprising:
    sending a notification in response to retrieval of the document by the recipient.

5. The computer-implemented method of claim 1, wherein the expiration includes an expiration date.

6. The computer-implemented method of claim 1, wherein the reference for the document is pushed by a content management system.

7. The computer-implemented method of claim 1, wherein the recipient system is unable to reject the reference for the document prior to the retrieval of the document.

8. The computer-implemented method of claim 1, further comprising:
    partitioning the document into a plurality of segments, wherein a portion of the document including one or more of the plurality of segments is designated for the recipient, and wherein the reference includes a unique reference to indicate the one or more segments of the document to retrieve for the recipient.

* * * * *